United States Patent [19]

Foss et al.

[11] 4,254,238

[45] Mar. 3, 1981

[54] HYDROCARBON/ETHYLENE OXIDE RANDOM GRAFT COPOLYMERS

[75] Inventors: Robert P. Foss, Hockessin; Henning W. Jacobson, Wilmington, both of Del.

[73] Assignee: E. I. Du Pont de Nemours and Company, Wilmington, Del.

[21] Appl. No.: 636,793

[22] Filed: Dec. 1, 1975

[51] Int. Cl.$^3$ .................. C08F 8/08; C08F 110/00
[52] U.S. Cl. .................. 525/335; 525/330; 525/332; 525/333; 525/366; 525/379; 525/385; 525/386
[58] Field of Search .............. 260/887, 879, 878 RB, 260/880 RB, 877, 874; 525/371, 332, 379, 367, 330, 366, 382, 335, 385, 386

[56] References Cited

U.S. PATENT DOCUMENTS

| | | | |
|---|---|---|---|
| 3,786,116 | 1/1974 | Milkovich et al. | 260/879 |
| 4,078,019 | 3/1978 | Langer, Jr. | 525/272 |
| 4,108,921 | 8/1978 | Langer, Jr. | 525/250 |

FOREIGN PATENT DOCUMENTS

| | | | |
|---|---|---|---|
| 46-34984 | of 1971 | Japan | 260/879 |
| 7308061 | of 1973 | Netherlands | 260/879 |

*Primary Examiner*—J. Ziegler

[57] ABSTRACT

Random graft copolymers comprising an essentially linear hydrocarbon base polymer having grafted thereto at least three ethylene oxide polymer chains, at least one of the ethylene oxide polymer chains being randomly located on the base polymer, are useful for preparing films and as antistatic agents for fiber forming polymers. These graft copolymers are formed by the steps of
  (a) contacting an essentially linear hydrocarbon base polymer containing at least three active sites selected from the group consisting of terminal lithium atoms and randomly located lithiatable hydrogen atoms, at least one of the active sites being a randomly located lithiatable hydrogen atom with a hydrocarbyllithium in the presence of a tertiary aliphatic diamine,
  (b) contacting the resulting lithiated base polymer with ethylene oxide followed by protonation with acid,
  (c) contacting the resulting hydroxyethylated base polymer with hydrocarbylpotassium,
  (d) contacting the resulting potassium oxyethylated base polymer with ethylene oxide in an amount sufficient to provide at least three ethylene oxide polymer chains, at least one of the ethylene oxide polymer chains being randomly located.

Also disclosed are block-random graft copolymers in which ethylene oxide block polymer chains are attached at one or both ends of the base polymer, thus extending the linear character of the backbone polymer chain, and at least one ethylene oxide graft polymer chain is attached randomly to the base polymer.

9 Claims, No Drawings

HYDROCARBON/ETHYLENE OXIDE RANDOM GRAFT COPOLYMERS

BACKGROUND OF THE INVENTION (1) Field of the Invention

This invention relates to a new class of hydrocarbon-/ethylene oxide random graft copolymers and a process for their preparation.

(2) Description of the Prior Art

Block copolymers, particularly those commonly designated as AB or ABA type polymers, are prepared by creating active sites at either or both ends of a linear backbone polymer and then polymerizing a second monomer at the active site(s). The product is a linear polymer containing one block of the backbone polymer (B) terminally joined to one or two blocks of the second polymer (A). The linkage by which the blocks are joined depends on the active site employed and the function by which it was attached to the backbone polymer. The strength or weakness of this linkage may control the thermal and chemical stability of the block copolymer.

Graft copolymers differ from block copolymers in that they are never linear, having a minimum of one branched chain per molecule. The graft chains are randomly arranged on the base polymer. One or two of the grafts may be terminally attached, but it is not essential that any of the grafts be attached to an end of the base polymer. The essential feature is the necessarily branched structure which accounts for some of the essential physical properties of the graft copolymer.

Dutch Pat. No. 7,308,061 (1973) shows the preparation of block copolymers (ABA) of diene polymers (B) and polyalkylene oxide (A) by polymerizing a diene hydrocarbon with a difunctional organopotassium compound and polymerizing an epoxyalkane onto the ends of the diene polymer. The products are agents for improving antistatic properties and impact resistance of synthetic resins, coatings for fibrous fleeces, components of adhesives and protective colloids.

Japanese Pat. No. 71 34,984 (1971) shows the preparation of block copolymers by heating hydroxyl-terminated polybutadiene with potassium hydroxide and ethylene oxide to give a butadiene/ethylene oxide graft copolymer.

U.S. Pat. No. 3,175,997 (1965) shows the preparation of polymers with terminal hydroxyl groups by polymerizing monomers with an organoalkali metal catalyst followed by reaction with an epoxide such as ethylene oxide.

Block-graft copolymers are shown in U.S. Pat. No. 3,821,331 in which terminal blocks and random side chains of pivalolactone polymer are attached through

linkages to a diene back-bone polymer.

In U.S. Pat. No. 3,897,513 graft copolymers are prepared by contacting an amorphous base polymer having random anionic sites selected from the group consisting of allylic, benzylic and aromatic carbonions, carboxylic anions and alkoxide anions with a β-lactone. Carbonion sites are developed by reacting the base polymer with an alkyllithium-diamine complex thereby lithiating the base polymer.

SUMMARY OF THE INVENTION

In accordance with this invention random graft copolymers are provided which comprise an essentially linear hydrocarbon base polymer having a number average molecular weight of about 1,000 to about 500,000, said base polymer having grafted thereto, at intervals of about 100 to about 100,000 units of number average molecular weight, at least three ethylene oxide polymer chains each having a molecular weight of about 100 to about 5,000,000, at least one of the ethylene oxide polymer chains being randomly located on the base polymer.

These random graft copolymers are prepared by the process which comprises (a) contacting (1) an essentially linear hydrocarbon base polymer having a number average molecular weight of about 1,000 to about 500,000 and containing at least three active sites selected from the group consisting of terminal lithium atoms and randomly located lithiatable hydrogen atoms, at least one of the active sites being a randomly located lithiatable hydrogen atom with (2) a hydrocarbyllithium selected from the group consisting of alkyllithiums, cycloalkyllithiums and aralkyllithiums in the presence of a tertiary aliphatic diamine, thereby replacing the lithiatable hydrogen atoms with lithium atoms to form lithiated base polymer containing at least three lithium atoms, at least one of which is randomly located, (b) contacting the lithiated base polymer with ethylene oxide followed by protonation with acid, thereby forming hydroxyethylated base polymer containing at least three hydroxyethyl groups, at least one of which is randomly located, (c) contacting the hydroxyethylated base polymer with sufficient hydrocarbylpotassium to provide about 0.1 to about 1 mole of potassium per mole of hydroxyethyl group, thereby forming potassium oxyethylated base polymer containing at least three potassium oxyethyl groups located at intervals of about 100 to about 100,000 units of number average molecular weight on the base polymer, at least one of the potassium oxyethyl groups being randomly located on the base polymer, and (d) contacting the potassium oxyethylated base polymer with ethylene oxide in an amount sufficient to provide at least three ethylene oxide polymer chains having a molecular weight of about 100 to about 5,000,000, at least one of the ethylene oxide polymer chains being randomly located.

DETAILED DESCRIPTION OF THE INVENTION

The random graft copolymers of this invention are of the formula

wherein

B is the base polymer,
the A's are ethylene oxide graft polymer chains, at least one of which is a random graft polymer chain, and
m is a whole number from 3 to about 1,000, representing the number of ethylene oxide graft polymer chains.

Throughout the specification and claims the term "graft polymer chain" is used to designate both block polymer chains and random graft polymer chains.

The base polymers used in accordance with this invention are essentially linear hydrocarbon polymers. By "essentially linear" is meant polymers which are completely free of pendant groups or which have pendant groups of such short chain length, for example pendant alkyl or aromatic groups, that the linear character of the polymer is not materially affected.

The base polymer can be prepared by any polymerization technique. Preferably the base polymer is prepared by polymerization using a difunctional lithium-alkyl initiator in which case the base polymer is terminated at both ends by a lithium site. When this base polymer is used in the process of this invention the resulting polymer is a block-random graft copolymer of the formula

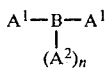

wherein
B is the base polymer,
$A^1$ is an ethylene oxide block polymer chain attached to the end of the base polymer,
$A^2$ is an ethylene oxide graft polymer chain randomly located on the base polymer, and
n is a whole number from 1 to about 1,000, and preferably about 5 to about 500, representing the number of ethylene oxide graft polymer chains randomly located on the base polymer.

These block-random graft copolymers represent the preferred embodiment of this invention.

The base polymer is a hydrocarbon homopolymer or copolymer containing at least three active sites selected from the group consisting of terminal lithium atoms and random lithiatable hydrogen atoms. By "terminal lithium atoms" is meant lithium atoms at the ends of polymer chains as a result of the use of a mono- or di-functional lithium-alkyl polymerization initiator. By "lithiatable hydrogen atom" is meant hydrogen atoms characterized by sufficient activity to be capable of replacement by lithium when treated with a hydrocarbyllithium in the presence of a tertiary aliphatic diamine. Since the base polymer can have a maximum of only two terminal lithium atoms, at least one of the active sites will be a random lithiatable hydrogen atom.

The base polymer can be a homopolymer or copolymer including terpolymers having a number average molecular weight in the range of about 1,000 to about 500,000 and preferably about 25,000 to about 200,000. The polymer must have at least one randomly located lithiatable hydrogen atom. Suitable active hydrogens are illustrated by allylic type hydrogens such as those on carbon atoms adjacent to a double bond in the polymer chain. Most diene polymers and copolymers possess many such active hydrogens per molecule. Another type of hydrogen of sufficient activity is illustrated by the first hydrogen of a methyl substituent on an aromatic ring of the hydrocarbon polymer such as those in poly-p-methylstyrene.

Suitable base polymers include polyisoprene; polybutadiene; vinyl aromatic/alkadiene copolymers such as styrene/butadiene, α-methylstyrene/butadiene, and vinylfluorene/butadiene; copolymers of isoprene and/or butadiene with ethylene, propylene, isobutylene, styrene, and alkyl substituted styrene styrene/butadiene styrene ABA block copolymers; ethylene/propylene/nonconjugated diene terpolymers made from the dienes such as 1,4-hexadiene, methylenenorbornene, ethylidenenorbornene, propenylnorbornene and dicyclopentadiene; branched chain ethylene/propylene/nonconjugated diene tetrapolymers made with combinations of nonconjugated dienes such as 1,4-hexadiene/norbornadiene and 1,4-hexadiene/1,7-octadiene; copolymers of methyl substituted styrenes and vinyl naphthalenes with ethylene, propylene and/or isobutylene; as well as homopolymers of methyl substituted styrenes and vinyl naphthalenes such as 3-methylstyrene, 4-methylstyrene, 3,5-dimethylstyrene, 2,4,6-trimethylstyrene, 4,5-dimethyl-1-vinylnapthalene, and 3-methyl-5,6-diethyl-8-n-propyl-2-vinylnapthalene; and the like.

Random active lithium sites are developed on these polymers by reaction with a hydrocarbyllithium selected from the group consisting of alkyl-, cycloalkyl-, and aralkyllithiums in the presence of a tertiary aliphatic diamine. In these lithiating reactions the lithium atoms do not generate more than one active anionic site each. Accordingly, the average number of activated carbanionic sites per molecule of substrate polymer depends upon the molecular weight of the polymer and the amount of lithiating agent used.

Because of their high activity, lower alkyllithiums are the preferred lithiating agents. Representative hydrocarbyllithiums are the primary, secondary and tertiary alkyl and cycloalkyl lithiums of 1 to 12 carbon atoms including methyllithium, ethyllithium, isopropyllithium, n-butyllithium, isobutyllithium, s-butyllithium, t-butyllithium, neopentyllithium, octyllithium, dodecyllithium, menthyllithium, cyclobutyllithium, cyclopentyllithium, and cyclohexyllithium. Aralkyllithiums such as benzyllithium and cumyllithium can sometimes also be used. Sec-butyllithium is preferred.

The lithiation step is carried out in the presence of a tertiary aliphatic diamine which assists in the reaction by forming a complex with the hydrocarbyllithium. Suitable diamines include tetraalkylalkylenediamines such as N,N,N',N'-tetramethylethylenediamine (TMEDA), N,N,N',N'-tetraethylethylenediamine, N,N,N',N'-tetrabutylethylenediamine, and N,N,N',N'-tetrabutyl-1,4-butylenediamine; cycloalkyldiamines such as triethylenediamine and sparteine; and the like.

In the lithiation step the hydrocarbon polymer is employed in the form of a solution in a nonpolar, saturated aliphatic hydrocarbon solvent such as cyclohexane, isooctane, and the like. The temperature for carrying out the lithiation step may vary over the range from about 0° to about 100° C., and is preferably in the range of about 15° to about 60° C.

The time to be allowed for the lithiation step to take place is not a critical variable. As soon as the reactants are brought together under the above conditions, at least some lithiated product will form. For best yields it is preferred to allow the reaction to continue from about 10 minutes to about 20 hours. Longer reaction periods fail to yield products with significantly improved properties. Hydrocarbyllithiums complexed with diamines can react intramolecularly by proton abstraction and subsequent lithiation of carbons in the diamines. Accordingly, in using these agents it is desirable to minimize these side reactions by not prolonging the reaction time.

In the lithiation reaction the order of mixing the polymer, the hydrocarbyllithium, and the diamine is not critical. Premixing the hydrocarbyllithium and the diamine before contact with the polymer is believed, however, to reduce undesirable formation of metalated clusters and high local concentrations of metalating agent.

The lithiated polymer is then hydroxyethylated. The hydroxyethylation step consists of reaction of the lithiated polymer with ethylene oxide, followed by protonation. The reaction with ethylene oxide may be carried out in the nonpolar solvent in which the lithiated polymer is prepared. However, this leads to rapid formation of a very stiff gel whereby only part of the lithiated sites on the polymer are reached by the ethylene oxide. In the preferred embodiment gel formation is greatly reduced by adding the nonpolar solvent solution of lithiated polymer to a volume of a carefully dried ether containing the dissolved ethylene oxide. The volume of ether can vary from an equivalent amount to an amount whch is double the volume of the lithiated polymer solution. Suitable ethers include tetrahydrofuran, dioxane, diethyl ether, dimethyl ether of ethylene glycol, dimethyl ether of diethylene glycol, and the like. Tetrahydrofuran is preferred. Under these conditions substantially all of the lithiated sites will react with ethylene oxide.

The molar ratio of ethylene oxide to moles of lithiated sites in the polymer may vary from about 1:1 to about 100:1. Since only one ethylene oxide unit reacts with each lithiated site in this part of the process, it is preferred to use molar ratios from about 1:1 to about 50:1.

Reaction of the lithiated polymer with ethylene oxide is carried out at temperatures in the range of about −40° to about 100° C. To avoid loss of the relatively volatile ethylene oxide, it is preferred to carry out this reaction at temperatures in the range from about −40° to about 35° C. Temperatures from about 35° to about 100° C. are operable in a closed system.

Before preparing the ethylene oxide solution in the hydroxyethylation step, it may be desirable to scavenge the solvent and the reactor from active impurities. This may be done by adding a preformed red colored solution of disodium diphenylethylene dimer, NaC$\phi_2$CH$_2$CH$_2$C$\phi_2$Na, in tetrahydrofuran until a red color persists in the solution. It may also be done by adding a small amount (such as 1 ml per liter) of diphenylethylene followed by gradual addition of n-butyllithium until the red color of LiC$\phi_2$CH$_2$C$_4$H$_9$ persists, thereby insuring the absence of impurities that reduce the yield in the hydroxyethylation step.

The hydroxyethylation step is completed by reacting the intermediate lithiated product with an acid thereby replacing the lithium on the ethylene oxide group with hydrogen. Suitable acids include dilute mineral acids such as hydrochloric, nitric and sulfuric, and other acids such as glacial acetic acid, and the like.

Conversions of the hydroxyethyl groups to potassium oxyethyl groups is carried out by the action of a hydrocarbylpotassium on the hydroxyethylated polymer. Any hydrocarbylpotassium which is more basic than potassium alkoxide is suitable. Triphenylmethyl potassium is the preferred species of reactant, but other hydrocarbylpotassiums may be employed such as benzylpotassium, 2-phenyl-2-propylpotassium, fluorenylpotassium, naphthaleneylpotassium, and the like. The hydrocarbylpotassium should be employed in an amount sufficient to provide from about 0.1 to about 1 mole of potassium per mole of hydroxyethyl groups on the polymer. The potassium oxyethyl groups should be located on the base polymer at intervals of about 100 to about 100,000 units of number average molecular weight, and preferably at intervals of about 500 to about 50,000.

The potassium reaction is preferably carried out in the temperature range from about 0° to about 100° C. Pressure is not a critical variable and atmospheric pressure is preferred. The reaction is preferably conducted in an organic solvent, especially an ether such as tetrahydrofuran, dioxane, dimethyl ether of ethylene glycol, and the like. When there are many hydroxyethyl groups per molecule of polymer, the potassium derivatives are less soluble and it may be desirable to add an auxiliary solubilizing agent such as 1,4,7,10,13,16-hexaoxacycloocatadecane (18-crown-6).

In the grafting step, ethylene oxide is supplied in an amount varying from about 3 to about 100,000 moles of ethylene oxide per mole of oxyethyl groups of the polymer, depending on the desired length of the polyethylene oxide chains to be formed. The ethylene oxide polymer chains should each have a molecular weight of about 100 to about 50,000,000, and preferably about 500 to about 500,000. The temperature for polymerizing the ethylene oxide may vary from about 10° to about 100° C., and preferably is in the range from about 20° C. up to the reflux temperature of the solvent employed. It is preferred to carry out the polymerization in a polar organic solvent. Ethers such as tetrahydrofuran, dioxane, dimethyl ether of ethylene glycol, and the like are preferred. Atmospheric pressure is ordinarily suitable for conducting the polymerization, but superatmospheric pressures may also be employed, if it is desired to speed up the polymerization.

When the polymerization of ethylene oxide is complete, the catalytic potassium atom at the end of each polyethylene oxide chain is removed by treatment with a protonating agent. An acid such as acetic acid, hydrochloric acid, and the like may be used. Water and acid ion-exchange resins are also operable. The soluble potassium acetate, chloride, hydroxide, etc. which forms is washed out of the polymer by known means.

The block-graft copolymers of this invention are useful as thermally formed, tough sheeting for wrapping as illustrated in Example 1. Rubbery polymers containing many relatively short polyethylene oxide grafts are also useful as antistatic agents when melt-incorporated into nylons and other fiber forming polymers. When the polyethylene oxide chains have molecular weights below about 800, they are amorphous and the polymers can undergo cold flow. When the polyethylene oxide chains have molecular weights above about 800, they tend to be crystalline, thereby stabilizing the rubbery properties of the polymer.

EXAMPLES OF THE INVENTION

The following examples illustrate the novel random graft copolymers of this invention and the method of their preparation. All parts are by weight unless otherwise indicated.

EXAMPLE 1

Part A—Polymerization of Isoprene with a Lithium Initiator

A dry 2-liter resin kettle under a slight positive pressure of argon and provided with a motor-driven stirrer, thermocouple well, and a rubber septum through which additions could be made was charged with 1100 ml of carefully dried cyclohexane and 180 ml (ca. 120 g) of freshly purified isoprene. The solution was stirred and heated with an oil bath. To the solution at 45° C. was added 36 ml of a 0.1 N solution of 1,3-bis(1-lithio-1,3-dimethylpentyl) benzene which had been prepared by adding 2 moles of sec-butyllithium to 1 mole of m-diisopropenylbenzene in the presence of 0.2 mole of triethylamine with cyclohexane as solvent. Over the next 30 minutes, the temperature of the polymerizing isoprene solution was kept between 45° and 50° C. by intermittent cooling. When the exotherm was over, the oil bath at 60° C. was restored and the polymerization was carried out for a total of 2.5 hours after adding the initiator.

Part B—Polylithiation of Polyisoprene

To the polyisoprene solution from Part A was added 3.0 ml of tetramethylethylenediamine and the solution was stirred for 30 minutes at room temperature. There was then added 12.2 ml of 1.25 N sec-butyllithium in hexane. The total number of millimoles of lithium (18.8) in the solution, including that at the polyisoprene ends, was slightly lower than the number of millimoles of tetramethylethylenediamine (19.8) available for complexing. The lithiation reaction was carried out at room temperature for 1.5 hours.

Part C—Hydroxyethylation of Lithiated Polyisoprene

A dry, 4-liter resin kettle provided with a motor-driven stirrer and kept under a slight positive pressure of argon was charged with 1400 ml of tetrahydrofuran dried by distillation from sodium. The vessel and solvent were scavenged of traces of moisture and other possible impurities by adding a red colored solution of 1,4-disodium-1,1,4,4-tetraphenylbutane formed from the reaction of sodium and 1,1,-diphenylethylene in tetrahydrofuran until a reasonably stable pink color was obtained. Thirty-five grams of ethylene oxide was then dissolved in the tetrahydrofuran. The solution of the lithiated polyisoprene from Part B was piped under argon pressure to the ethylene oxide solution through a dry glass U tube of 8 mm bore. The capping reaction to give hydroxyethyl groups at the active sites of the polyisoprene took place rapidly as evidenced by immediate discharge of the reddish-amber color of the lithiated polyisoprene solution and the formation of a gel of the insoluble lithium alkoxide of hydroxyethylated polyiosprene.

The viscous gel resulting from capping the lithiated polyisoprene with ethylene oxide was made acid with hydrochloric acid. This resulted in an immediate drop in viscosity. Some of the solvent was removed and the resulting hydroxyethylated polyisoprene was freed of impurities by precipitating four times by adding a tetrahydrofuran solution of the polymer to ethyl alcohol.

Removal of essentially all of the alcohol and traces of moisture was accomplished by dissolving the polymer in benzene followed by removal of the solvent in a rotary evaporator. This was repeated for a total of five times. As much benzene as possible was removed in the last of these operations and the polymer was dissolved in dry tetrahydrofuran to give a 12.5% by weight solution. The infrared spectrum of this polymer showed absorption for hydroxyl.

Part D—Conversion of Hydroxyethyl Groups to Potassium Oxyethyl Groups

To a 500 ml, round bottom flask having a side arm for additions, a motor-driven stirrer, and a dry-ice cooled condenser was added 200 ml of the 12.5% hydroxyethylated polyisoprene solution from Part C (approximately 22 g of polymer). It was estimated that this polymer had approximately 0.1 meq of hydroxyl per gram. To the solution was added 12 ml of 0.17 N triphenylmethylpotassium in glyme. The red color of the potassium derivative disappeared as the polymer hydroxyl groups were converted to potassium alkoxide. At the end of the addition, a relatively small amount of gel separated. This was substantially redissolved by warming the solution and adding more tetrahydrofuran.

Part E—Random Graft Polymerization of Ethylene Oxide

The solution from Part D was cooled and 17 g of ethylene oxide was added. Heating was resumed and the temperature was raised gradually to prevent vigorous refluxing of the ethylene oxide. When the temperature of the solution reached 64° C., indicating that substantially all of the ethylene oxide had polymerized, heating was discontinued. The solution was made acid with hydrochloric acid and the polymer was recovered by precipitation in water. The highly swollen polymer was filtered and dried under vacuum at 60° C. to give an essentially quantitative yield of block-graft copolymer.

The calculated composition based on quantitative conversions in each step except approximately 65% efficiency in the lithiation, indicated the product to be a polyisoprene block of 67,000 molecular weight containing grafted polyethylene oxide units of 7700 molecular weight at the ends and along the polyisoprene chain at intervals of 109 isoprene units or 7400 molecular weight.

Films of this polymer pressed at 175° C. were rubbery. In contrast to the corresponding unmodified polyisoprene/ethylene oxide ABA block copolymer of the prior art, films of the block-graft copolymer of this example were essentially tack-free and did not stick together. Differential scanning calorimetry showed a melting point for the polyethylene oxide grafts beginning at 40° C. and peaking at about 50° C. It is evident that these crystalline graft segments convert the sticky polyisoprene/ethylene oxide ABA block copolymer to a thermoplastic elastomer.

EXAMPLE 2

Part A—Polymerization of Isoprene

The procedure of Part A of Example 1 was repeated.

Part B—Polylithiation of Polyisoprene

To the polyisoprene solution from Part A was added 31 g (204 mmoles) of tetramethylethylenediamine and the solution was stirred for 30 minutes at room temperature. There was then added 156 ml of 1.28 N sec-butyllithium (200 mmoles) in hexane. The solution was then stirred under argon overnight at room temperature to complete the lithiation.

Part C—Hydroxyethylation of Lithiated Polyisoprene

The product from Part B above was treated by the procedures of Part C of Example 1. Using the method of Floria et al., Anal. Chem. 36, 2053 (1964) the resulting polymer was found to have 1.0 meq of hydroxyl function per gram.

Part D—Conversion of Hydroxyethyl Groups to Potassium Oxyethyl Groups

In the glass vessel described in Part D of Example 1 was placed 90 g of the solution from Part C above. This was an 11.8% tetrahydrofuran solution of hydroxyethylated polyisoprene containing a total of 10.6 meq of hydroxyl function. To this was added 7.5 ml of 1.4 N 1,4,7,10,13,16-hexaoxacyclooctadecane (18-crown-6, 10.5 mmoles) in tetrahydrofuran followed by 42 ml of 0.2 N triphenylmethyl potassium in tetrahydrofuran. The red color of the triphenylmethyl potassium solution was discharged within a few seconds with the formation of the potassium oxyethyl groups.

Part E—Random Graft Polymerization of Ethylene Oxide

To the solution from Part D 9 g of ethylene oxide was added and the temperature was carefully raised until the boiling temperature of tetrahydrofuran was reached, indicating disappearance of all the monomeric ethylene oxide. The resulting block-graft copolymer was recovered by precipitating twice into petroleum ether from tetrahydrofuran solution. It was then dissolved in 225 ml of ethanol, diluted with 100 ml of water and passed through an ion-exchange column containing an organic strong acid cationexchange resin to remove potassium hydroxide. Water and alcohol were then removed in a rotary evaporator and the polymer was dried under vacuum at 60° C. The yield of block-graft copolymer was substantially quantitative.

Differential scanning calorimetry on the block-graft copolymer of Example 2 showed a shallow endotherm commencing at 39° C. and peaking at 46° C. indicating the presence of at least some crystalline polyethylene oxide. The composition of this copolymer calculated from gel permeation chromatography molecular weight of the polyisoprene, titration of the hydroxyethyl groups, weight of the ethylene oxide grafted and copolymer carbon, hydrogen and oxygen content was a block-graft copolymer having a polyisoprene backbone of 97,000 molecular weight with 45% by weight of polyethylene oxide units of 820 molecular weight at the ends and spaced along the backbone at an average of approximately 15 isoprene units or 1000 molecular weight of backbone.

We claim:

1. A random graft copolymer which comprises an essentially linear hydrocarbon base polymer having a number average molecular weight of 1000 to 500,000, said base polymer having grafted thereto, at intervals of 100 to 100,000 units of number average molecular weight, at least three hydroxyl-terminated ethylene oxide polymer chains each having a molecular weight of 100 to 5,000,000 selected from the group consisting of ethylene oxide polymer chains terminally located on the base polymer and ethylene oxide polymer chains randomly located on the base polymer, at least one of the ethylene oxide polymer chains being randomly located on the base polymer.

2. The random graft copolymer of claim 1 in which the base polymer has a number average molecular weight of 25,000 to 200,000, and the ethylene oxide polymer chains each have a molecular weight of 500 to 500,000, grafted to the base polymer at intervals of 500 to 50,000 units of number average molecular weight.

3. The random graft copolymer of claim 2 in which the base polymer is polyisoprene.

4. The random graft copolymer of claim 1 which is a block-random graft copolymer of the formula

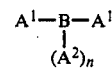

wherein
B is the base polymer
$A^1$ is an hydroxyl-terminated ethylene oxide block polymer chain attached to the end of the base polymer,
$A^2$ is an hydroxyl-terminated ethylene oxide graft polymer chain randomly located on the base polymer, and
n is a whole number from 1 to 1000, representing the number of hydroxyl-terminated ethylene oxide graft polymer chains randomly located on the base polymer.

5. The block-random graft copolymer of claim 4 in which the base polymer has a number average molecular weight of 25,000 to 200,000, the ethylene oxide polymer chains each have a molecular weight of 500 to 500,000, and n is 5 to 500.

6. The block-random graft copolymer of claim 5 in which the base polymer is polyisoprene.

7. Method of preparing a random graft copolymer which comprises
   (a) contacting
       (1) an essentially linear hydrocarbon base polymer having a number average molecular weight of 1,000 to 500,000 and containing at least three active sites selected from the group consisting of terminal lithium atoms and randomly located lithiatable hydrogen atoms, at least one of the active sites being a randomly located lithiatable hydrogen atom with
       (2) a hydrocarbyllithium selected from the group consisting of alkyllithiums, cycloalkyllithiums and aralkyllithiums in the presence of a tertiary aliphatic diamine, thereby replacing the lithiatable hydrogen atoms with lithium atoms to form lithiated base polymer containing at least three lithium atoms, at least one of which is randomly located,
   (b) contacting the lithiated base polymer with ethylene oxide followed by protonation with acid, thereby forming hydroxyethylated base polymer containing at least three hydroxyethyl groups, at least one of which is randomly located,
   (c) contacting the hydroxyethylated base polymer with sufficient hydrocarbylpotassium to provide 0.1 to 1 mole of potassium per mole of hydroxyethyl group, thereby forming potassium oxyethylated base polymer containing at least three potassium oxyethyl groups located at intervals of 100 to 100,000 units of number average molecular weight on the base polymer, at least one of the potassium oxyethyl groups being randomly located on the base polymer, (d) contacting the potassium oxyethylated base polymer with ethylene oxide in an amount sufficient to provide at least three ethylene oxide polymer chains having a molecular weight of 100 to 5,000,000 selected from the group consisting of terminal ethylene oxide polymer chains and randomly located ethylene oxide polymer chains, at least one of the ethylene oxide polymer chains being randomly located, and (e) contacting the resulting polymer with a protonating agent thereby forming at least three hydroxyl-terminated ethylene oxide polymer chains.

8. The method of claim 7 in which the base polymer has a molecular weight of 25,000 to 200,000, has terminal lithium atoms at both ends, and has at least 5 randomly located lithiatable hydrogen atoms, the potassium oxyethyl groups are located at intervals of 500 to 50,000 units of number average molecular weight, and the ethylene oxide polymer chains have a molecular weight of 500 to 500,000.

9. The method of claim 8 in which the base polymer is polyisoprene.

* * * * *